(12) United States Patent
Baba

(10) Patent No.: US 11,125,388 B2
(45) Date of Patent: Sep. 21, 2021

(54) METHOD OF MANUFACTURING HIGH-PRESSURE TANK AND HIGH-PRESSURE TANK

(71) Applicant: TOYOTA JIDOSHA KABUSHIKI KAISHA, Toyota (JP)

(72) Inventor: Yoichiro Baba, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 16/520,685

(22) Filed: Jul. 24, 2019

(65) Prior Publication Data
US 2020/0096156 A1   Mar. 26, 2020

(30) Foreign Application Priority Data
Sep. 20, 2018   (JP) .............................. JP2018-175615

(51) Int. Cl.
*B29C 53/56* (2006.01)
*F17C 1/06* (2006.01)

(52) U.S. Cl.
CPC ................ *F17C 1/06* (2013.01); *B29C 53/56* (2013.01); *F17C 2201/0109* (2013.01); *F17C 2203/0604* (2013.01); *F17C 2203/067* (2013.01); *F17C 2203/0614* (2013.01); *F17C 2209/2154* (2013.01)

(58) Field of Classification Search
CPC ............. B29C 53/56; F17C 2209/2154; F17C 2203/067; F17C 2203/0604
See application file for complete search history.

(56) References Cited

U.S. PATENT DOCUMENTS

2016/0341359 A1    11/2016   Nishibu
2020/0332960 A1*   10/2020   Sato ..................... B29C 66/1312

FOREIGN PATENT DOCUMENTS

| JP | 2013-176975 A | * | 9/2013 |
| JP | 2016-217466 | | 12/2016 |
| JP | 2017-106524 A | | 6/2017 |

* cited by examiner

*Primary Examiner* — Jeffry H Aftergut
(74) *Attorney, Agent, or Firm* — Oblon, McClelland, Maier & Neustadt, L.L.P.

(57) ABSTRACT

A high-pressure tank in a method of manufacturing a high-pressure tank includes a liner and a fiber. The manufacturing method includes: preparing a dome and a pipe each having a general portion and a joining end portion formed to be thicker than the general portion such that an outer diameter at least at an end face is larger than an outer diameter of the general portion by an estimated level difference amount; joining the joining end portion of the dome and the joining end portion of the pipe together in an axial direction; cutting off portions on the further outer side in a radial direction than a reference plane, with an outer peripheral surface of the general portion of the dome having a large outer diameter at the joined surface as the reference plane; and winding a carbon fiber around the outer peripheral surface of the liner in helical winding.

3 Claims, 11 Drawing Sheets

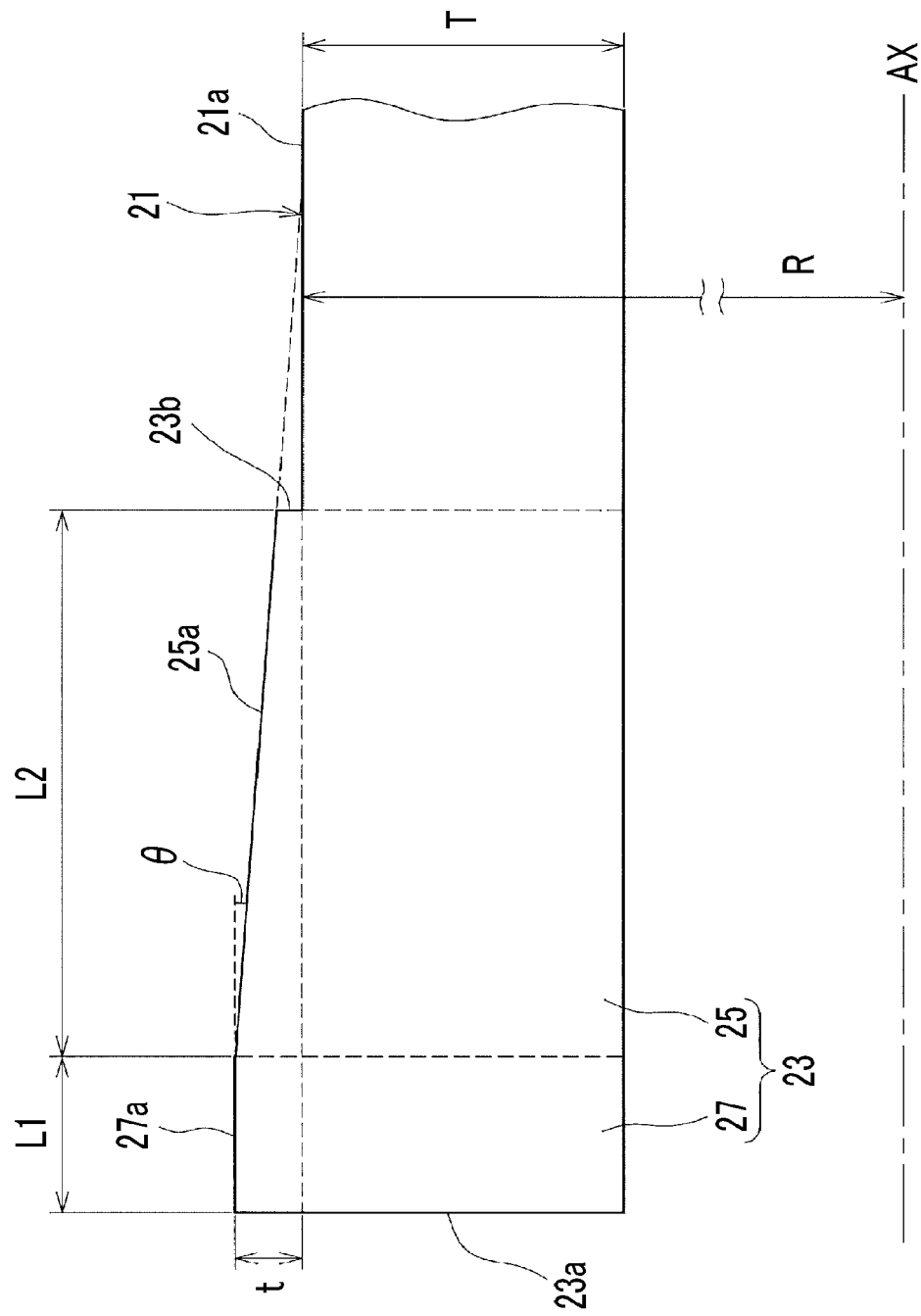

METHOD OF MANUFACTURING HIGH-PRESSURE TANK AND HIGH-PRESSURE TANK

INCORPORATION BY REFERENCE

The disclosure of Japanese Patent Application No. 2018-175615 filed on Sep. 20, 2018 including the specification, drawings and abstract is incorporated herein by reference in its entirety.

BACKGROUND

1. Technical Field

The present disclosure relates to a method of manufacturing a high-pressure tank and a high-pressure tank, and in particular, to a method of manufacturing a high-pressure tank in which a fiber is wound around an outer periphery of the liner made by joining a plurality of parts together, and a high-pressure tank.

2. Description of Related Art

As a method of manufacturing a high-pressure tank, a filament winding method in which a high-strength outer shell is formed by winding a fiber around the outer periphery of a liner configuring an inner shell has been known in the past.

A fiber winding method in the filament winding method is classified roughly into hoop winding in which a fiber is wound at substantially right angles with respect to a liner center line, and a helical winding in which a fiber is wound at a predetermined angle (fiber angle) with respect to a liner center line.

In such a filament winding method, it is known that strength is improved when winding is performed such that the tension of a fiber becomes constant. However, in the case of the helical winding, fibers are concentrated at an end portion of the liner according to folding-back of the fibers, so that a fiber layer becomes thicker than the other portions, and therefore, there is a problem in that the shape of the end portion deviates from an even tension curved surface as the winding of the fiber is repeated.

Therefore, for example, Japanese Unexamined Patent Application Publication No. 2016-217466 (JP 2016-217466 A) proposes the shape of a dome portion having a predetermined curved surface different from an even tension curved surface, in which an even tension curved surface is formed in a process of winding a fiber with helical winding, in a high-pressure tank having a hemispherical dome portion at an end portion of the liner.

SUMMARY

Incidentally, the liner configuring an inner shell of the high-pressure tank is usually formed in a tubular hollow body in which both ends are substantially closed, and therefore, at least one joined portion is formed. For example, when bottomed cylindrical parts (hereinafter also referred to as "domes") are joined together in an axial direction, one joined portion is formed, and, for example, when a cylindrical part (hereinafter also referred to as a "pipe") is interposed between two domes and joined to the two domes in the axial direction, two joined portions are formed.

Then, although it is not mentioned in JP 2016-217466 A, it is known that, even though parts such as a dome and a pipe are molded products, a level difference inevitably occurs at a joined portion between the parts due to variation in the shrinkage factor of a material, misalignment at the time of joining, or the like. In this way, when a fiber is wound around the outer periphery of the liner in a state where a level difference is generated at the joined portion, there is a case where a harmful gap in which the strength is lowered is formed between the fiber and the liner.

Therefore, it is conceivable to cut off the level difference, based on the outer diameter of the part having a small outer diameter at a joined surface. However, in this case, there is a problem in that the thickness of the cut-off part (the part having a large outer diameter at the joined surface) is thinned (it becomes difficult to secure the minimum plate thickness).

The present disclosure provides a technique for suppressing occurrence of a harmful gap between a liner and a fiber while the minimum plate thickness of the liner is secured, in a method of manufacturing a high-pressure tank in which the fiber is wound around an outer periphery of the liner made by joining a plurality of parts together, and the high-pressure tank.

In the method of manufacturing a high-pressure tank and the high-pressure tank of the present disclosure, the shape of an end portion of a part configuring a joined portion in a liner is optimized.

A first aspect of the present disclosure relates to a method of manufacturing a high-pressure tank. The high-pressure tank includes a liner formed by joining a plurality of cylindrical liner constituent members together, and a fiber wound around an outer periphery of the liner. (In this specification, a "cylindrical shape" is meaning including a "substantially cylindrical shape").

The manufacturing method includes preparing the cylindrical liner constituent members each having a cylindrical general portion and a joining end portion formed to be thicker than the cylindrical general portion such that, in a case where an estimated value of an amount of a level difference that is generated at a joined surface where the liner constituent members are joined together is set to be an estimated level difference amount, an outer diameter at least at an end face is larger than an outer diameter of the cylindrical general portion by the estimated level difference amount, as the cylindrical liner constituent members.

The manufacturing method includes joining the joining end portion of one of the cylindrical liner constituent members and the joining end portion of another one of the cylindrical liner constituent members together in an axial direction, cutting off portions on a further outer side in a radial direction than a reference plane, in both the joining end portions joined together, with an outer peripheral surface of the cylindrical general portion having a large outer diameter at the joined surface, out of the liner constituent members joined together, as the reference plane, and winding the fiber around an outer peripheral surface of the cylindrical liner in helical winding.

In the present disclosure, the "cylindrical liner constituent member" includes not only a cylindrical liner constituent member with both ends open but also a bottomed cylindrical liner constituent member or the like, which has a hemispherical dome portion at one end of a cylindrical portion, for example.

According to the first aspect of the present disclosure, the outer diameter at the end face of the cylindrical liner constituent member is larger than the outer diameter of the cylindrical general portion by the estimated level difference amount, and therefore, when the portion further on the outer side in the radial direction than the reference plane (the outer peripheral surface of the cylindrical general portion) is cut off after joining, the amount corresponding to a rising height (=estimated level difference amount) at the joined surface is cut off. Therefore, it is possible to reliably cut off the level difference at the joined surface, which has occurred within the range of the estimated level difference amount, and in this way, it is possible to suppress occurrence of a harmful gap, in which the strength is lowered, between the liner and the fiber.

According to the first aspect of the present disclosure, the portion further on the outer side in a radial direction than the outer peripheral surface (the reference plane) of the cylindrical general portion of the cylindrical liner constituent member having a large outer diameter at the joined surface is cut off, whereby an end portion having the same thickness as that of the cylindrical general portion (hereinafter also referred to as a "first joining end portion") is formed on the side of the liner constituent member having a larger outer diameter and an end portion having a larger outer diameter than the cylindrical general portion and being thicker than the cylindrical general portion (hereinafter also referred to as a "second joining end portion") is formed on the side of the cylindrical liner constituent member having a smaller outer diameter. Therefore, a portion that becomes thinner in thickness than the cylindrical general portion is not generated, and therefore, it is possible to secure the minimum plate thickness of the liner.

According to the first aspect of the present disclosure, it is possible to suppress occurrence of a harmful gap between the liner and the fiber while the minimum plate thickness of the liner is secured.

Incidentally, for example, in a configuration in which the joining end portion before joining is formed into a cylindrical shape having a larger outer diameter than the cylindrical general portion and being thicker than the cylindrical general portion and the joining end portion and the cylindrical general portion are connected to each other by a stepped surface, there is a case where a large stepped surface remains at the boundary between the second joining end portion and the cylindrical general portion after the joining. In this case, even though there is no level difference at the joined surface between the first joining end portion and the second joining end portion, there is a case where a harmful gap occurs between the liner and the fiber at the boundary (the stepped surface) between the second joining end portion and the cylindrical general portion. On the other hand, in a case where the joining end portion before joining is made in a tapered shape, for example, when the cylindrical liner constituent member is joined by melting the joining end portion, the thickness (cross-sectional area) of the joining end portion changes, and therefore, there is a problem in that it is difficult to make a joining processing condition such as a heat input amount constant.

In the method according to the first aspect, the joining end portion before joining may have a cylindrical joining margin portion located at an extreme end portion of the joining end portion and having an outer diameter larger than the outer diameter of the general portion by the estimated level difference amount, and a tapered portion having an outer diameter that decreases from the joining margin portion toward the cylindrical general portion so as to connect an outer peripheral surface of the joining margin portion and an outer peripheral surface of the cylindrical general portion, and the joining end portions of the respective cylindrical liner constituent members may be joined together by melting the joining margin portions of the respective cylindrical liner constituent members.

According to the first aspect of the present disclosure, the tapered portion is provided at the joining end portion, whereby the closer to the cylindrical general portion, the smaller the difference between the outer diameter of the second joining end portion and the outer diameter of the cylindrical general portion becomes, and therefore, it is possible to suppress occurrence of a harmful gap between the liner and the fiber not only at the joined surface between the first joining end portion and the second joining end portion but also at the boundary between the second joining end portion and the cylindrical general portion. In addition, the cylindrical joining margin portion having a constant thickness (cross-sectional area) is provided at the extreme end portion of the joining end portion, and therefore, when the joining end portions of the respective cylindrical liner constituent members are joined together by melting the joining margin portions of the respective liner constituent members, it is possible to make it easier to make a joining processing condition such as a heat input amount constant.

However, even though a tapered portion is provided at the joining end portion, when the inclination angle of the tapered portion is extremely large, there is a case where a harmful gap occurs between the liner and the fiber at the time of filament winding, and on the other hand, when the inclination angle of the tapered portion is extremely small, there is a case where the second joining end portion is lengthened more than is needed and useless thickening of the liner occurs.

In the method according to the first aspect, an inclination angle of the tapered portion may be set so as to satisfy a relationship of an following expression, $\tan \theta = t \times \tan \psi / (R \times (1 - R^2/(R+t)^2)^{1/2})$. Here, $\theta$ may be the inclination angle of the tapered portion, t may be the estimated level difference amount, $\psi$ may be a fiber angle of the fiber with respect to a center line of the liner in the winding, and R may be an outer circumference radius of the cylindrical general portion.

According to the first aspect of the present disclosure, by defining the inclination angle of the tapered portion in association with the performance of the high-pressure tank (the outer circumference radius R related to the storage amount of the high-pressure tank, the fiber angle $\psi$ related to the strength of the high-pressure tank, and t related to the level difference amount), it is possible to optimize the inclination angle of the tapered portion in the high-pressure tank having the needed performance and to minimize the gap between the liner and the fiber.

In the method according to the first aspect, the inclined surfaces of the tapered portions of the respective liner constituent members may be stepped down to the outer peripheral surfaces of the general portions before the inclined surfaces intersect the outer peripheral surfaces of the cylindrical general portions, and the joining end portions of the respective cylindrical liner constituent members may be joined together in a state where the cylindrical general portions of the respective cylindrical liner constituent members are gripped and fixed.

When the difference between the outer diameter of the tapered portion that is reduced in diameter and the outer diameter of the general portion becomes sufficiently small, it is not needed to extend the inclined surface until it intersects (is connected to) the outer peripheral surface of the cylindrical general portion. In this respect, according to the aspect of the present disclosure, the inclined surface of the tapered portion is stepped down before it intersects the outer peripheral surface of the cylindrical general portion, and therefore, it is possible to shorten the tapered portion (lengthen the general portion that is a regular dimension portion), and in this way, it is possible to suppress useless thickening and improve a yield. Further, the boundary between the joining end portion and the cylindrical general portion can be easily understood when the cylindrical general portion is gripped and fixed, and therefore, the joining processing can be easily performed. In addition, the tapered portion is made short, and therefore, even though the cylindrical general portion that is easier to be gripped than the tapered portion is gripped and fixed, it is possible to bring a fixing position close to the joined surface, and in this way, it is possible to improve positioning precision.

A second aspect of the present disclosure relates to a high-pressure tank. The high-pressure tank includes a liner configured by joining a plurality of cylindrical liner constituent members together, and a fiber wound around an outer periphery of the liner.

The liner includes cylindrical general portions, and a joined portion configured by joining joining end portions of the liner constituent members together in an axial direction, the joined portion includes a first joining end portion and a second joining end portion, of which outer diameters at a joined surface are equal to each other, the first joining end portion has the same thickness as the thickness of the cylindrical general portion, and the second joining end portion has a larger outer diameter than the cylindrical general portion and is thicker than the cylindrical general portion.

According to the second aspect of the present disclosure, the joined portion is configured of the first joining end portion and the second joining end portion, in which the outer diameters at the joined surface are equal to each other, and therefore, it is possible to suppress occurrence of a harmful gap between the liner and the fiber. Further, since the first joining end portion has the same thickness as that of the cylindrical general portion and the second joining end portion has a larger outer diameter than the cylindrical general portion and is thicker than the cylindrical general portion, it is possible to secure the minimum plate thickness of the liner.

According to the second aspect of the present disclosure, a level difference inevitably occurs at the joined surface between the liner constituent members due to variation in the shrinkage factor of a material, misalignment at the time of joining, or the like. However, with the method of manufacturing a high-pressure tank, it is possible to suitably realize the joined portion according to the second aspect of present disclosure, which is configured of the first joining end portion having the same thickness as that of the cylindrical general portion and the second joining end portion having a larger outer diameter than the cylindrical general portion and being thicker than the cylindrical general portion, the first joining end portion and the second joining end portion having the outer diameters equal to each other at the joined surface.

In the high-pressure tank according to the second aspect, the second joining end portion may include a tapered portion having an outer diameter that decreases with increasing distance in the axial direction from the joined surface.

According to the second aspect of the present disclosure, the closer to the cylindrical general portion, the smaller the difference between the outer diameter of the second joining end portion and the outer diameter of the cylindrical general portion becomes, and therefore, even at the boundary between the second joining end portion and the cylindrical general portion, occurrence of a harmful gap between the liner and the fiber can be suppressed.

In the high-pressure tank according to the second aspect, an inclined surface of the tapered portion may be stepped down to an outer peripheral surface of the general portion before the inclined surface intersects the outer peripheral surface.

According to the second aspect of the present disclosure, it is possible to shorten the tapered portion (lengthen the general portion that is a regular dimension portion), and in this way, it is possible to suppress useless thickening and improve a yield.

According to the aspects of the present disclosure, with the method of manufacturing a high-pressure tank and the high-pressure tank of the present disclosure, it is possible to suppress occurrence of a harmful gap between the liner and the fiber while the minimum plate thickness of the liner is secured.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5 is a sectional view schematically showing a joining end portion of a liner constituent member before joining;

DETAILED DESCRIPTION OF EMBODIMENTS

Hereinafter, a mode for carrying out the present disclosure will be described with reference to the drawings.

High-Pressure Tank

Figure 1:
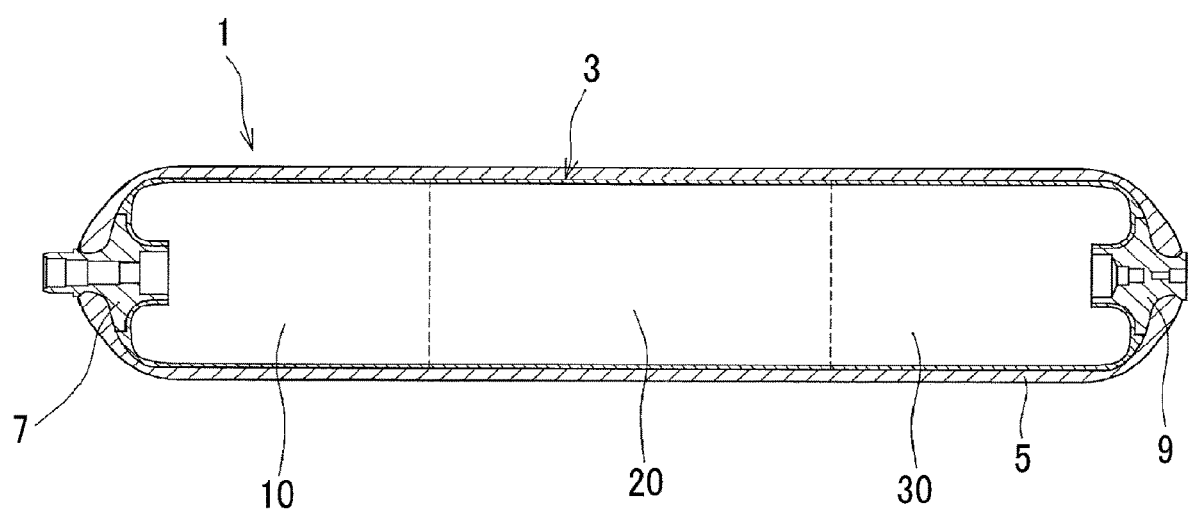
FIG. 1 is a sectional view schematically showing a high-pressure tank according to an embodiment of the present disclosure.

FIG. 1 is a sectional view schematically showing a high-pressure tank 1 according to this embodiment. As shown in FIG. 1, the high-pressure tank 1 includes a cylindrical liner 3 as an inner shell, a carbon fiber 5 which forms an outer shell by being laminated by being wound around the outer periphery of the liner 3, and aluminum caps 7, 9 that are assembled to both ends of the liner 3 by press fitting.

The liner 3 is made of resin and is composed of three split-formed cylindrical liner constituent members 10, 20, 30, as shown in FIG. 1. Specifically, the liner 3 is configured by interposing one pipe 20 between two domes 10, 30 and joining the pipe and the domes together in an axial direction.

Figure 2A:
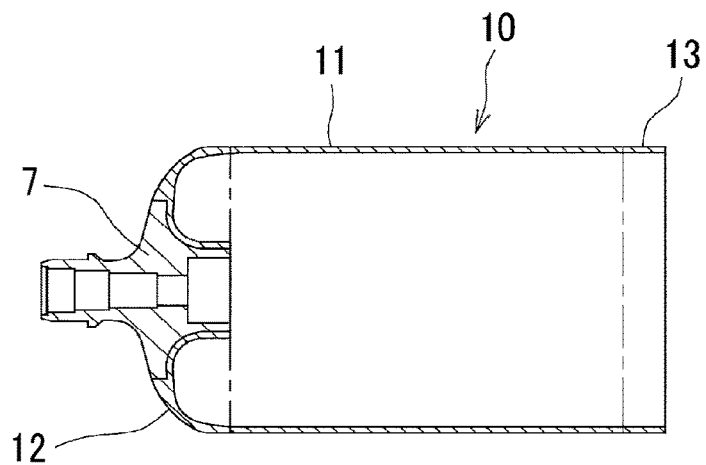
FIG. 2A is a sectional view schematically showing a liner constituent member and shows a dome.
Figure 2B:
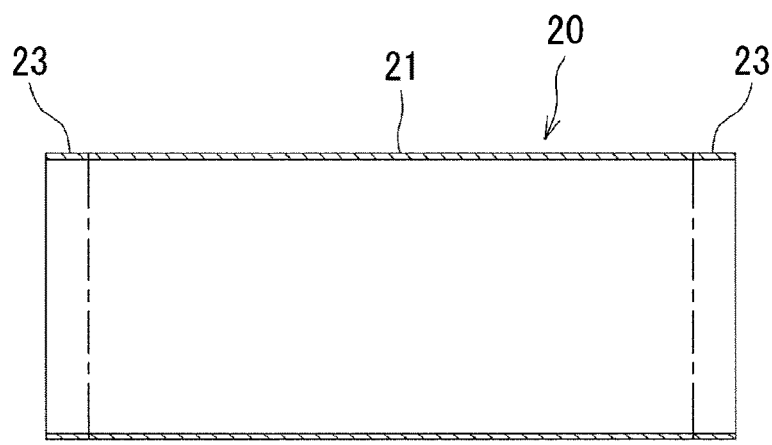
FIG. 2B is a sectional view schematically showing a liner constituent member and shows a pipe.
Figure 2C:
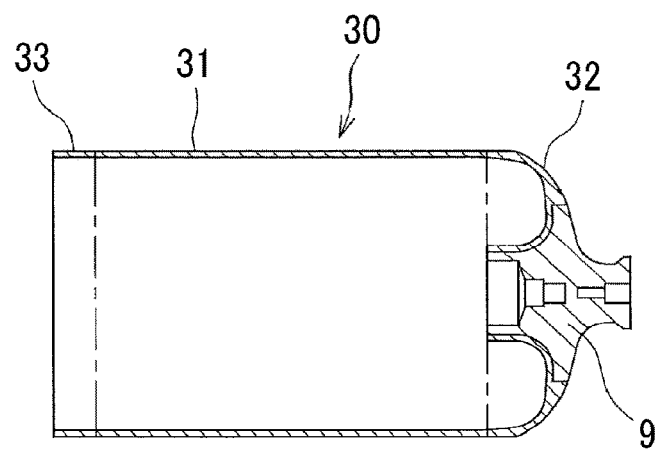
FIG. 2C is a sectional view schematically showing a liner constituent member and shows a dome.

FIGS. 2A to 2C are sectional views schematically showing the liner constituent members 10, 20, 30, in which FIGS. 2A and 2C show the domes 10, 30 and FIG. 2B shows the pipe 20. Each of the domes 10, 30 is formed in a bottomed cylindrical shape. More specifically, the domes 10, 30 have cylindrical general portions 11, 31, hemispherical dome portions 12, 32 that are provided so as to close first ends of the general portions 11, 31 and to which the caps 7, 9 are assembled, and joining end portions 13, 33 provided at second ends of the general portions 11, 31. On the other hand, the pipe 20 is formed in a cylindrical shape with both ends opened and has a cylindrical general portion 21 and joining end portions 23 provided at both ends of the general portion 21. In the domes 10, 30 and the pipe 20, the outer diameters and the inner diameters thereof in the general portions 11, 21, 31 are formed with the same design value. Further, the joining end portions 13, 23, 33 are also formed with the same shape and dimension.

The dome 10 and the pipe 20 are joined together by an infrared welding method in which each of the extreme end portion of the joining end portion 13 and the extreme end portion of the joining end portion 23 is heated and melted by infrared rays and both the extreme end portions are then pressure-bonded to each other. Similarly, the pipe 20 and the dome 30 are joined together by an infrared welding method in which each of the extreme end portion of the joining end portion 23 and the extreme end portion of the joining end portion 33 is heated and melted by infrared rays and both the extreme end portions are then pressure-bonded to each other. Then, a protruding protrusion (a bead 50 or the like (refer to FIG. 6B)) according to the joining is treated by grinding or the like, whereby a joined portion 40 is formed.

Figure 3A:
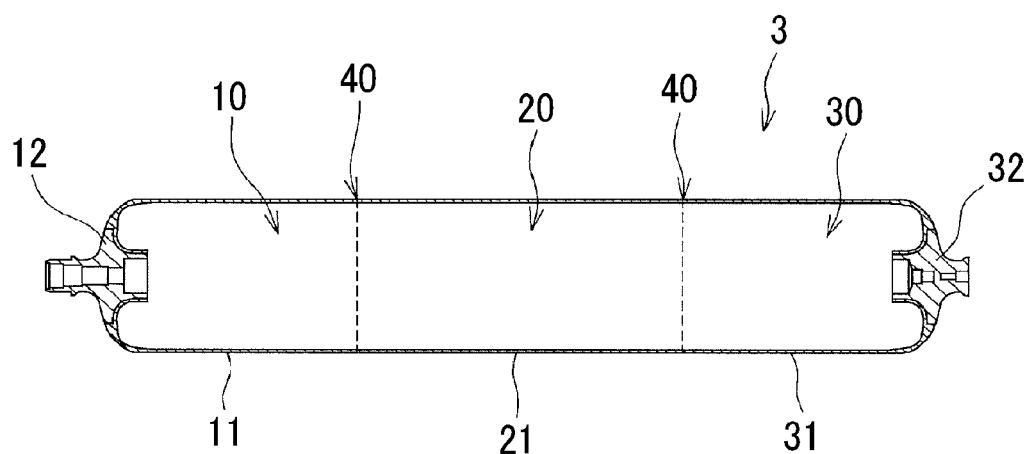
FIG. 3A is a sectional view schematically showing a liner and shows the entire liner.
Figure 3B:
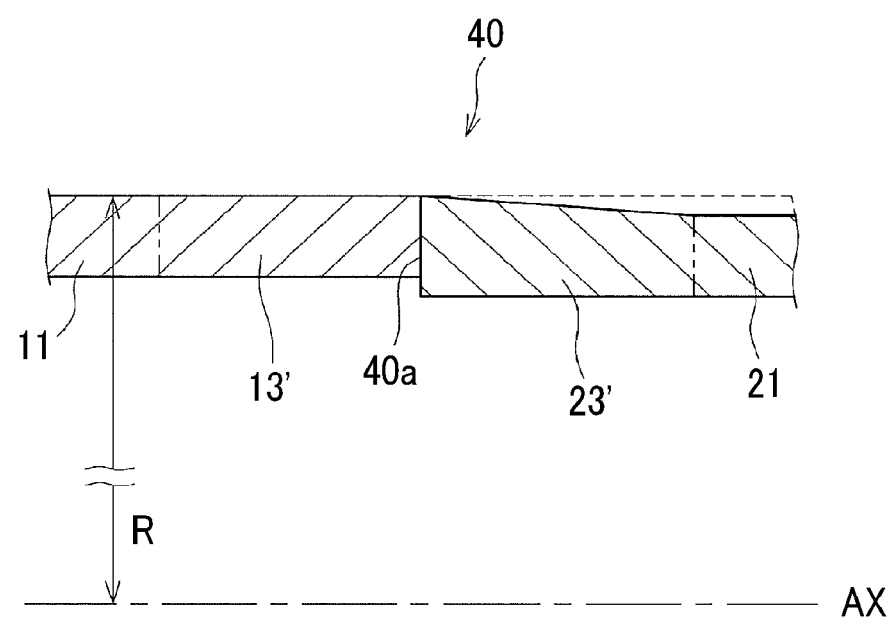
FIG. 3B is a sectional view schematically showing a liner and shows a joined portion in an enlarged manner.

FIGS. 3A and 3B are sectional views schematically showing the liner 3, in which FIG. 3A shows the entire liner 3 and FIG. 3B shows the joined portion 40 in an enlarged manner. In FIG. 3B, a stepped surface 23b (described later) is not shown.

As described above, the domes 10, 30 and the pipe 20 are joined together by the infrared welding method, whereby the liner 3 of this embodiment has the dome portions 12, 32 at both ends, three cylindrical general portions 11, 21, 31, and two joined portions 40, as shown in FIG. 3A. Further, each of the joined portions 40 is configured of a first joining end portion 13' and a second joining end portion 23', in which the outer diameters at a joined surface 40a are equal to each other, as shown in FIG. 3B. The first joining end portion 13' has the same thickness as that of the general portion 11, whereas the second joining end portion 23' has a larger outer diameter than the general portion 21 and is formed to be thicker than the general portion 21. Details of the joined portion 40 will be described later.

Figure 4A:
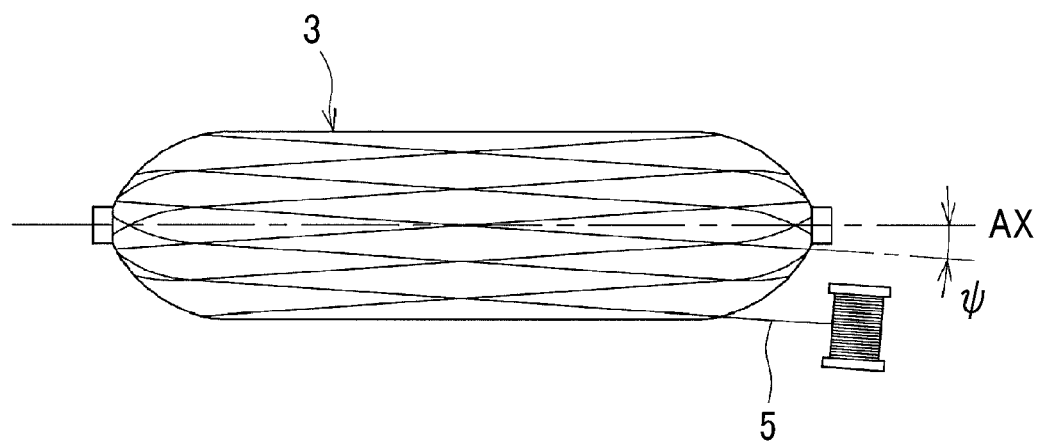
FIG. 4A is a diagram schematically describing a method of winding a fiber in a filament winding method and shows helical winding.
Figure 4B:
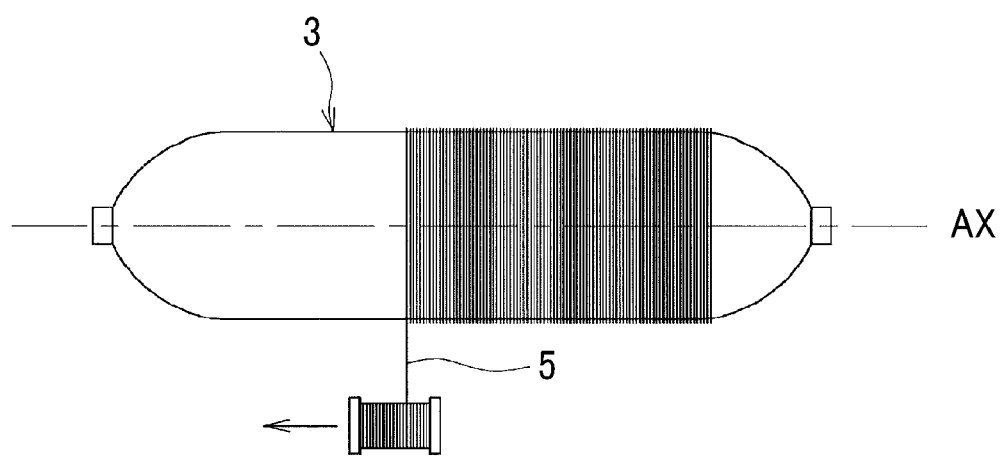
FIG. 4B is a diagram schematically describing a method of winding a fiber in a filament winding method and shows hoop winding.

FIGS. 4A and 4B are diagrams schematically describing a method of winding a carbon fiber 5 in a filament winding method, in which FIG. 4A shows helical winding and FIG. 4B shows hoop winding. In the high-pressure tank 1 of this embodiment, the outer shell is formed by winding the carbon fiber 5 around the outer periphery of the liner 3 by the filament winding method. In this embodiment, the helical winding in which the carbon fiber 5 is wound at a predetermined angle with respect to a liner center line AX, as shown in FIG. 4A, and the hoop winding in which the carbon fiber 5 is wound substantially at right angles with respect to the liner center line AX, as shown in FIG. 4B, are used together.

Specifically, after the lowermost layer is wound with the helical winding, an upper layer is wound with the hoop winding. In this way, the dome portions 12, 32 can be mainly protected by the carbon fibers 5 that are wound with oblique crossing with respect to the caps 7, 9 at both ends at the time of the helical winding, and the general portions 11, 21, 31 can be mainly protected by the carbon fibers 5 that are wound with the hoop winding. In the helical winding, since the carbon fibers 5 are wound with oblique crossing with respect to the caps 7, 9 at both ends, an extending direction of the carbon fiber 5 is oblique with respect to the liner center line AX, and the angle is referred to as a fiber angle N'

Joined Portion

Next, the joined portion 40 will be described in detail. However, in order to make it easy to understand the present disclosure, a joined portion in the related art will be described before the description of the joined portion 40.

Figure 13:
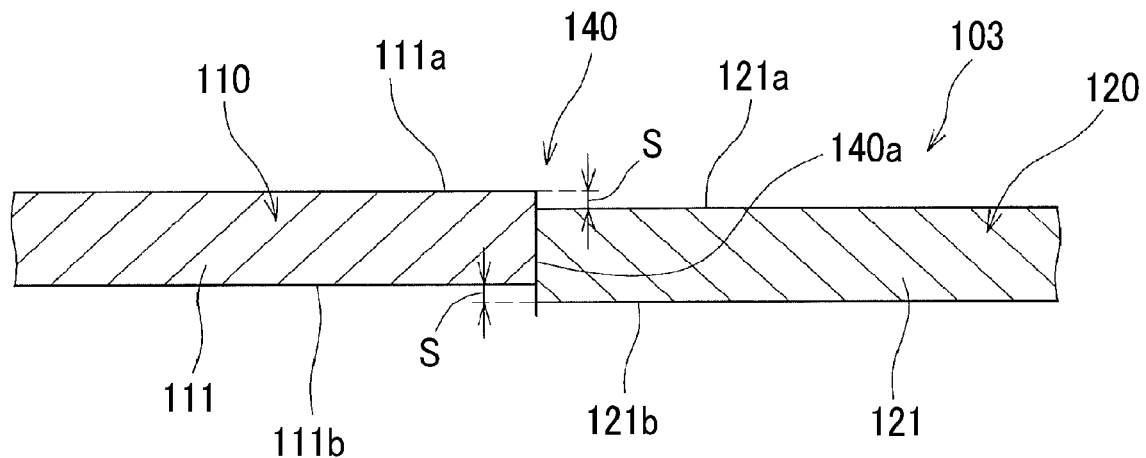
FIG. 13 is a diagram schematically describing a joined portion of a liner of the related art.
Figure 14:
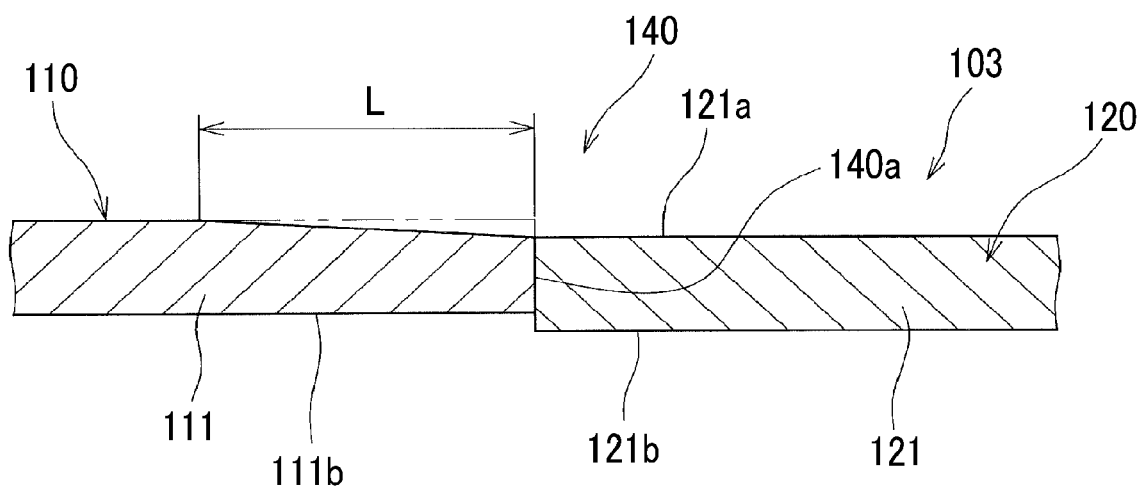
FIG. 14 is a diagram schematically describing the joined portion of the liner of the related art.

FIGS. 13 and 14 are diagrams schematically describing a joined portion 140 of a liner 103 of the related art. In FIGS. 13 and 14, a case where the outer diameter of a dome 110 is large at a joined surface 140a is exemplified. However, of course, there is also a case where the outer diameter of a pipe 120 is made large.

In the dome 110 and the pipe 120 of the related art, the joining end portions 13, 23 as in this embodiment are not provided, and end portions of general portions 111, 121 are directly joined together by the infrared welding method. The dome 110 and the pipe 120 are formed such that the outer diameters and the inner diameters in the general portions 111, 121 have the same design values. However, even in a molded product, a level difference S inevitably occurs between an outer peripheral surface 111a and an outer peripheral surface 121a (and an inner peripheral surface 111b and an inner peripheral surface 121b) at the joined surface 140a due to variation in the shrinkage factor of a material, misalignment at the time of joining, or the like. When the carbon fiber is wound around the outer periphery of the liner 103 in a state where the level difference S is generated in the joined portion 140 in this manner, a harmful gap that reduces strength is created between the carbon fibers and the liner 103.

For this reason, in order to reduce the level difference S, as shown in FIG. 14, it is conceivable to cut off an outer peripheral portion of the dome 110 having a large outer diameter such that the level difference S at the joined surface 140a disappears. However, in this case, the thickness of the dome 110 becomes thin in a cut-off section L, and thus there is a problem in that it becomes difficult to secure the minimum plate thickness of the liner 103.

Therefore, in the high-pressure tank 1 of this embodiment, the shapes of the joining end portions 13, 23, 33 configuring the joined portion 40 of the liner 3 are optimized. As described above, the joining end portions 13, 23, 33 have the same shape and dimension, and therefore, in the following, the joining end portion 23 of the pipe 20 will be described and the joined portion 40 in which the joining end portion 13 of the dome 10 and the joining end portion 23 of the pipe 20 are joined together will be described.

FIG. 5 is a sectional view schematically showing the joining end portion 23 of the pipe 20 before joining. In this embodiment, the joining end portion 23 is formed in a thickness (T+t) thicker than a thickness T of the general portion 21 such that the outer diameter at least at an end face 23a becomes larger than the outer diameter of the general portion 21 by an estimated level difference amount t. Here, the "estimated level difference amount t" is an estimated value of a level difference amount that can be generated at each of the joined surfaces 40a joining the liner constituent members 10, 20, 30 together, and is calculated using CAD in anticipation of variation in the shrinkage factor of a material, misalignment, or the like.

More specifically, as shown in FIG. 5, the joining end portion 23 has a cylindrical joining margin portion 27 located at the extreme end portion of the joining end portion 23 and having an outer diameter larger than the outer diameter of the general portion 21 by the estimated level difference amount t, and a tapered portion 25 having an outer diameter that decreases at an inclination angle θ from the joining margin portion 27 toward the general portion 21 so as to connect an outer peripheral surface 27a of the joining margin portion 27 and an outer peripheral surface 21a of the general portion 21. A section length L1 of the joining margin portion 27 is set to the amount of heat-melting at the time of infrared welding, and the deformation of the bead 50 or the like, which is formed according to the joining, is completed within the section length L1. That is, the joining margin portion 27 is converted into the bead 50 or the like by being joined by heat-melting, so that it does not remain at the joined portion 40 after the joining.

Further, an inclined surface 25a of the tapered portion 25 is stepped down to the outer peripheral surface 21a of the general portion 21 before it intersects (is connected to) the outer peripheral surface 21a. In other words, the inclined surface 25a of the tapered portion 25 and the outer peripheral surface 21a of the general portion 21 are connected through the stepped surface 23b. In this way, a section length L2 of the tapered portion 25 can be shortened as compared with a case where the inclined surface 25a of the tapered portion 25 intersects the outer peripheral surface 21a of the general portion 21. The height of the stepped surface 23b is set to the maximum value (for example, 0.4 (mm)) of an allowable range of a gap between the liner 3 and the carbon fiber 5 (a range of a gap that does not cause a decrease in strength).

Figure 6A:
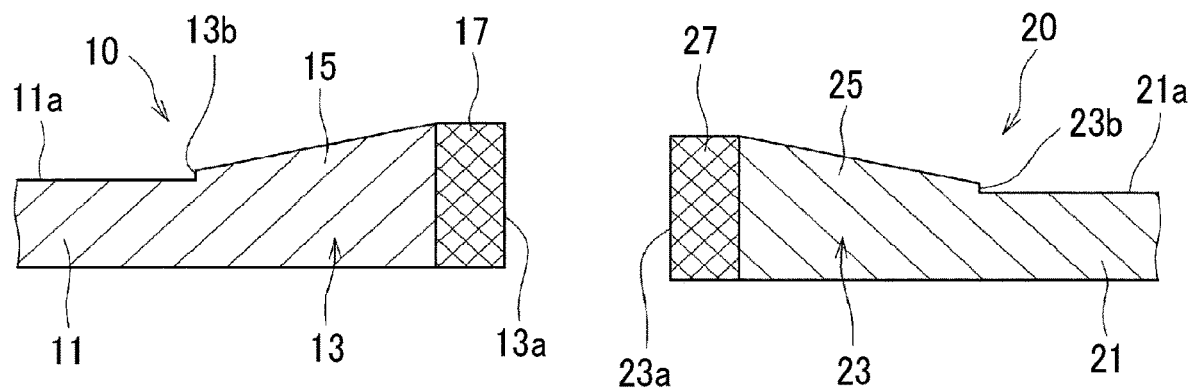
FIG. 6A is a diagram schematically describing a method of manufacturing a high-pressure tank and shows a joining process.
Figure 6B:
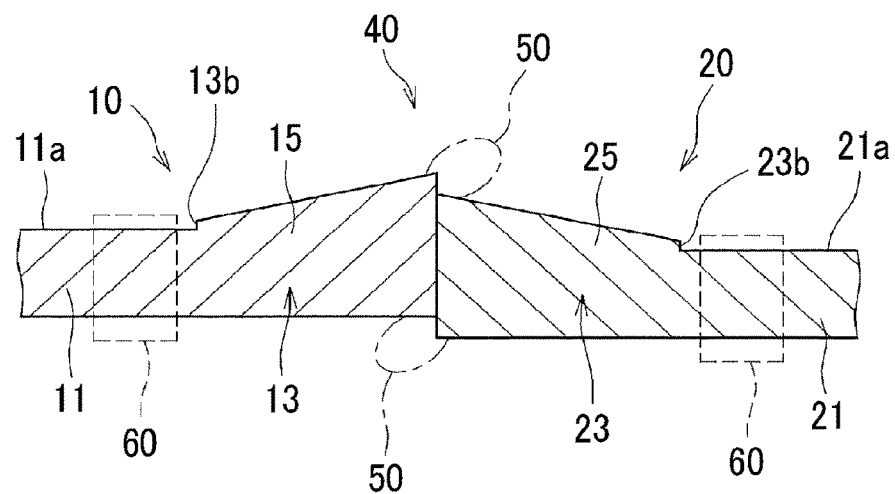
FIG. 6B is a diagram schematically describing the method of manufacturing a high-pressure tank and shows a joining process.
Figure 6C:
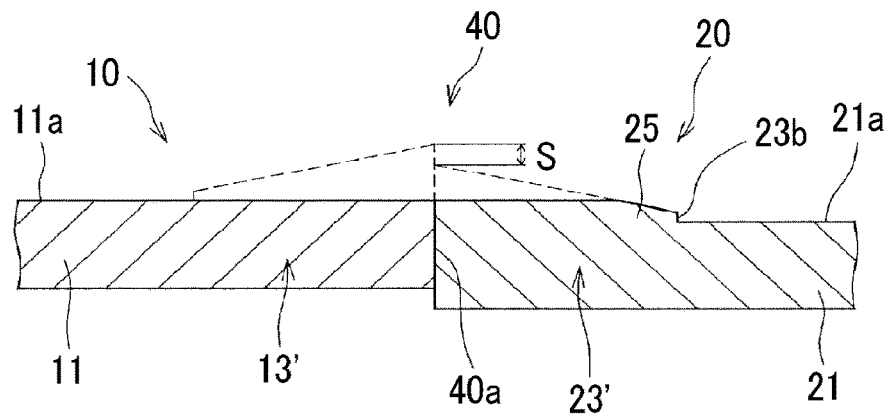
FIG. 6C is a diagram schematically describing the method of manufacturing a high-pressure tank and shows a cutting-off process.

The joining end portion 23 configured as described above is joined to the joining end portion 13 having the same configuration in the following procedure. FIGS. 6A to 6C are diagrams schematically describing a method of manufacturing a high-pressure tank 1, in which FIGS. 6A and 6B show a joining process and FIG. 6C shows a cutting-off process.

In the joining process, the joining end portion 13 of the dome 10 and the joining end portion 23 of the pipe 20 are joined together in the axial direction. More specifically, first, as shown by a shaded portion in FIG. 6A, a joining margin portion 17 in the joining end portion 13 of the dome 10 and the joining margin portion 27 in the joining end portion 23 of the pipe 20 are heated and melted by infrared rays. At this time, the joining margin portions 17, 27 are formed in a cylindrical shape, that is, a shape in which the cross-sectional area does not change, and therefore, a change in the amount of heating as in, for example, a case of joining the tapered portions 15, 25 together is not needed, so that it is easy to make a joining processing condition such as a heat input amount constant.

Next, as shown in FIG. 6B, the dome 10 and the pipe 20 are gripped and fixed by jigs 60 and are pressure-bonded to each other. In a case of gripping and fixing the dome 10 and the pipe 20 with the jigs 60, the flat general portions 11, 21 are easier to be gripped than the tapered portions 15, 25, and therefore, in this embodiment, the stepped surfaces 13b, 23b are provided, whereby it becomes easy to recognize the boundary between each of the tapered portions 15, 25 and each of the general portions 11, 21. Further, the stepped surfaces 13b, 23b are provided, whereby the section length L2 of the tapered portion 25 is shortened, so that it is possible to lengthen the general portions 11, 21 that are regular dimension portions, and in addition, even though the general portions 11, 21 are gripped and fixed by the jigs 60, a fixing position can be brought closer to a welded portion, and in this way, it is possible to improve positioning precision.

In this manner, when the dome 10 and the pipe 20 are joined together by the infrared welding method, as shown in FIG. 6B, the beads 50 converted from the molten joining margin portions 17, 27 are formed inside and outside the joined portion. However, the bead 50 on the outer side is cut off together with the level difference S in the subsequent cutting-off process.

In the cutting-off process, an outer peripheral surface 11a of the general portion 11 of the dome 10 that is the liner constituent member having a larger outer diameter at the joined surface 40a, out of the liner constituent members 10, 20 joined together in the joining process, is set as a reference plane, and portions further on the outer side in a radial direction than the reference plane (the outer peripheral surface 11a), of the joining end portions 13, 23 joined together in the joining process, are cut off. Here, the joining end portions 13, 23 are thickened by the estimated level difference amount t at the end faces 13a, 23a, and therefore, when the portion further on the outer side in the radial direction than the reference plane is cut off, it is possible to surely cut off the level difference S at the joined surface 40a, which is generated within the range of the estimated level difference amount t. In this way, as shown in FIG. 6C, the joined portion 40 that is composed of the first joining end portion 13' having the same thickness as that of the general portion 11 and the second joining end portion 23' having a larger outer diameter than the general portion 21 and being thicker than the general portion 21, in which the outer diameters of the first joining end portion 13' and the second joining end portion 23' at the joined surface 40a are equal to each other, that is, the joined portion 40 similar to that shown in FIG. 3B is formed. In a case where the level difference S is relatively small, a part of the tapered portion 25 (a difference between the estimated level difference amount t and the level difference S) is also cut off, as shown in FIG. 6C. However, in a case where the level difference S is equal to the estimated level difference amount t, as shown in FIG. 3B, the tapered portion 25 is not cut off and remains as it is.

Figure 7:
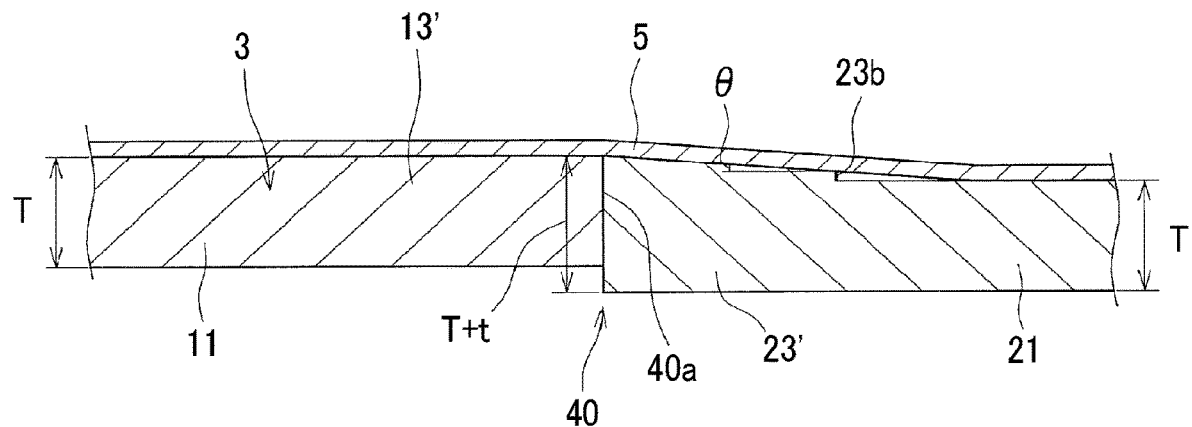
FIG. 7 is a sectional view schematically showing a joined portion around which a fiber is wound.

The carbon fiber 5 is wound around the outer peripheral surface of the liner 3 formed in this way and, for example, as shown in FIG. 3B, by the helical winding, whereby it is possible to obtain the joined portion 40 in which a harmful gap (a gap that reduces the strength of the high-pressure tank 1) is not generated between the liner 3 and the carbon fiber 5, while securing the minimum plate thickness of the liner 3 (having a plate thickness equal to or greater than the thickness T at any part of the liner 3), as shown in FIG. 7.

However, when the inclination angle θ of the tapered portion 25 that remains at the second joining end portion 23' is extremely large, there is a case where a harmful gap is generated between the liner 3 and the carbon fiber 5 at the time of the filament winding, and on the other hand, when the inclination angle θ of the tapered portion 25 is extremely small, there is a case where the second joining end portion 23' is lengthened more than is needed and useless thickening occurs.

Therefore, in this embodiment, the inclination angle θ of the tapered portion 25 is set so as to satisfy the relationship of Expression 1 by using the estimated level difference amount t and the fiber angle ψ in a case where the outer circumference radius of the general portion 21 is R.

$$\tan\theta = t \times \tan\psi / (R \times (1 - R^2/(R+t)^2)^{1/2}) \quad \text{(Expression 1)}$$

Hereinafter, this Expression 1 will be described.

Figure 8:
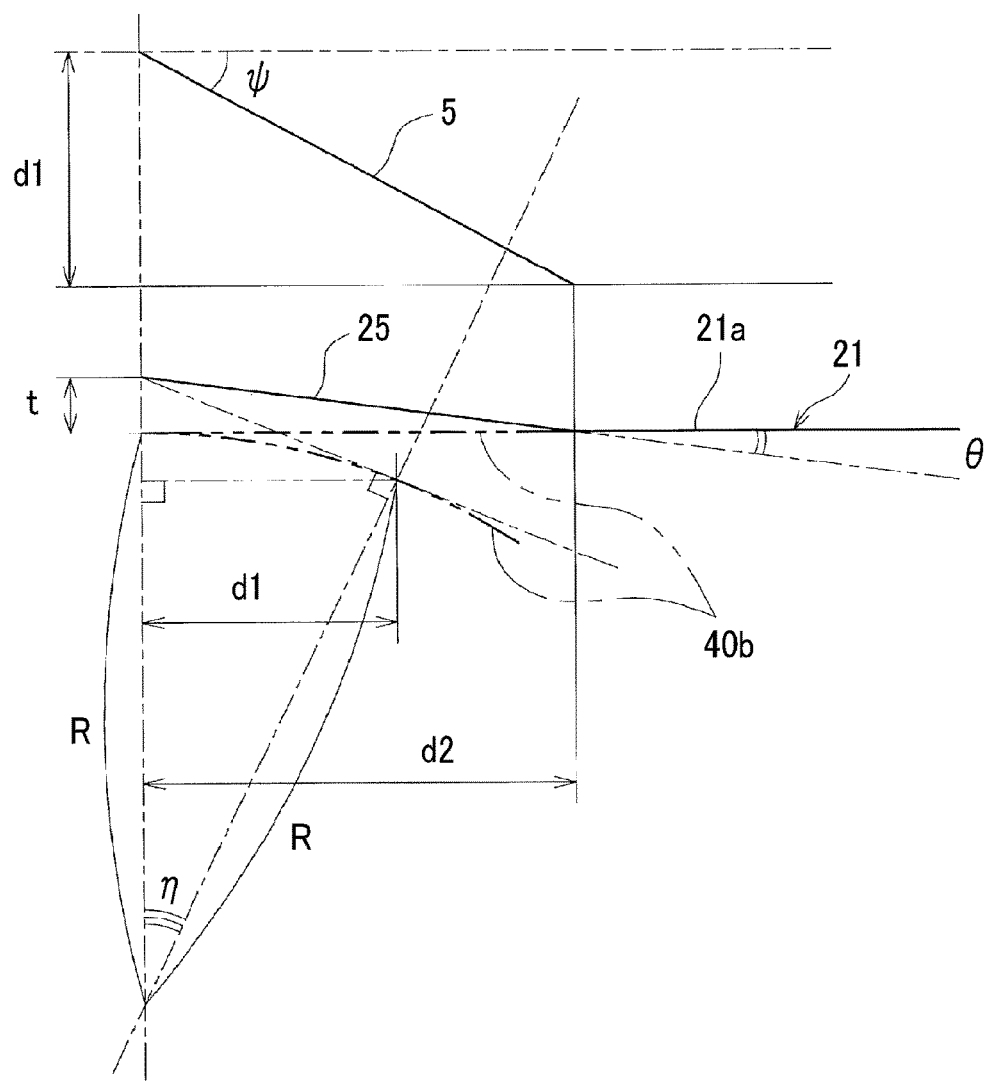
FIG. 8 is a conceptual diagram schematically describing a geometric relationship between a fiber angle and an inclination angle.

FIG. 8 is a conceptual diagram schematically describing a geometric relationship between the fiber angle ψ and the inclination angle θ. In FIG. 8, a top view in a state where the carbon fiber 5 is wound around the liner 3 with the helical winding, a side view of the tapered portion 25 of the second joining end portion 23', and an axial view of the second joining end portion 23' are arranged in order from the top in the same plane. A reference numeral 40b in the axial view is an imaginary line in a case where it is assumed that the second joining end portion 23' does not rise radially outward by the estimated level difference amount t at the joined surface 40a, and the radius of the imaginary line 40b coincides with the outer circumference radius R of the general portion 21. Therefore, in the side view, the imaginary line 40b and the outer peripheral surface 21a of the general portion 21 are flush with each other.

In FIG. 8, a state where the condition regarding the gap between the liner 3 and the carbon fiber 5 is the worst, in other words, a state where the tapered portion 25 is not cut off and a rising height (=estimated level difference amount t) at the joined surface 40a remains as it is, is assumed. Further, a state where the inclined surface 25a of the tapered portion 25 is not stepped down and extends obliquely from the joined surface 40a by a section length d2 to intersect the outer peripheral surface 21a of the general portion 21 is assumed. In such a state, the above Expression 1 expressing the geometrical relationship between the fiber angle ψ and the inclination angle θ in a case where the gap between the liner 3 and the carbon fiber 5 is assumed to be 0 is calculated.

First, in the top view of FIG. 8, assuming that the carbon fiber 5 is inclined by a length d1 in a lateral direction when the carbon fiber 5 is wound by the section length d2 in the axial direction, the fiber angle ψ is expressed by the following Expression 2.

$$\tan\psi = d1/d2 \quad \text{(Expression 2)}$$

Next, in the side view of FIG. 8, the inclined surface 25a of the tapered portion 25 extends by the section length d2 from the joined surface 40a having the rising height t while being inclined at the inclination angle θ and intersects the outer peripheral surface 21a of the general portion 21, and therefore, the inclination angle θ is expressed by the following Expression 3.

$$\tan\theta = t/d2 \quad \text{(Expression 3)}$$

Therefore, when d2 is deleted from Expression 2 and Expression 3, the following Expression 4 is obtained.

$$\tan\theta / \tan\psi = t/d1 \quad \text{(Expression 4)}$$

Here, in the axial view of FIG. 8, the radius R (=the outer circumference radius R of the general portion 21) of the imaginary line 40b and the length d1 can be expressed by the following Expression 5 by using a central angle η of the liner 3.

$$\sin\eta = d1/R \quad \text{(expression 5)}$$

When both sides of Expression 5 are squared, the following Expression 6 is obtained.

$$\sin^2\eta = (d1/R)^2 \quad \text{(expression 6)}$$

Further, in the side view and the axial view of FIG. 8, the relationship between the radius R of the imaginary line 40b and the rising height t can be expressed by the following Expression 7 by using the central angle η of the liner 3.

$$\cos\eta = R/(R+t) \quad \text{(expression 7)}$$

When both sides of Expression 7 are squared, the following Expression 8 is obtained.

$$\cos^2\eta = R^2/(R+t)^2 \quad \text{(expression 8)}$$

In this way, when both sides of Expression 6 and Expression 8 are added together and the central angle of the liner 3 is deleted, the following Expression 9 is obtained.

$$1 = (d1/R)^2 + R^2/(R+t)^2 \quad \text{(Expression 9)}$$

When Expression 9 is arranged with respect to the length d1, the following Expression 10 is obtained.

$$d1 = R \times (1 - R^2/(R+t)^2)^{1/2} \quad \text{(Expression 10)}$$

The above Expression 1 is obtained by substituting Expression 10 into Expression 4 and arranging the obtained expression.

In this manner, when the inclination angle θ of the tapered portion 25 (also called an ideal inclination angle θ) is determined by substituting the estimated level difference amount t (known), the fiber angle Iv (known), and the outer circumference radius R (known) of the general portion 21 into Expression 1 calculated on the assumption that the gap between the liner 3 and the carbon fiber 5 is 0, theoretically, a gap is not generated between the liner 3 and the carbon fiber 5.

Examples (Examples 1 to 4) of the ideal inclination angle θ actually obtained by calculation are shown in Table 1 below.

TABLE 1

|  | Example 1 | Example 2 | Example 3 | Example 4 |
|---|---|---|---|---|
| Fiber angle ψ (deg) | 35.0 | 30.0 | 30.0 | 30.0 |
| Outer circumference radius R (mm) | 150.0 | 150.0 | 150.0 | 100.0 |

TABLE 1-continued

|  | Example 1 | Example 2 | Example 3 | Example 4 |
|---|---|---|---|---|
| Estimated level difference amount t (mm) | 1.0 | 1.0 | 0.5 | 1.0 |
| Ideal inclination angle θ (deg) | 2.33 | 1.92 | 1.35 | 2.36 |

Next, the effect that is obtained by setting the ideal inclination angle θ of the tapered portion 25 by using the above Expression 1 was verified.

Figure 9:
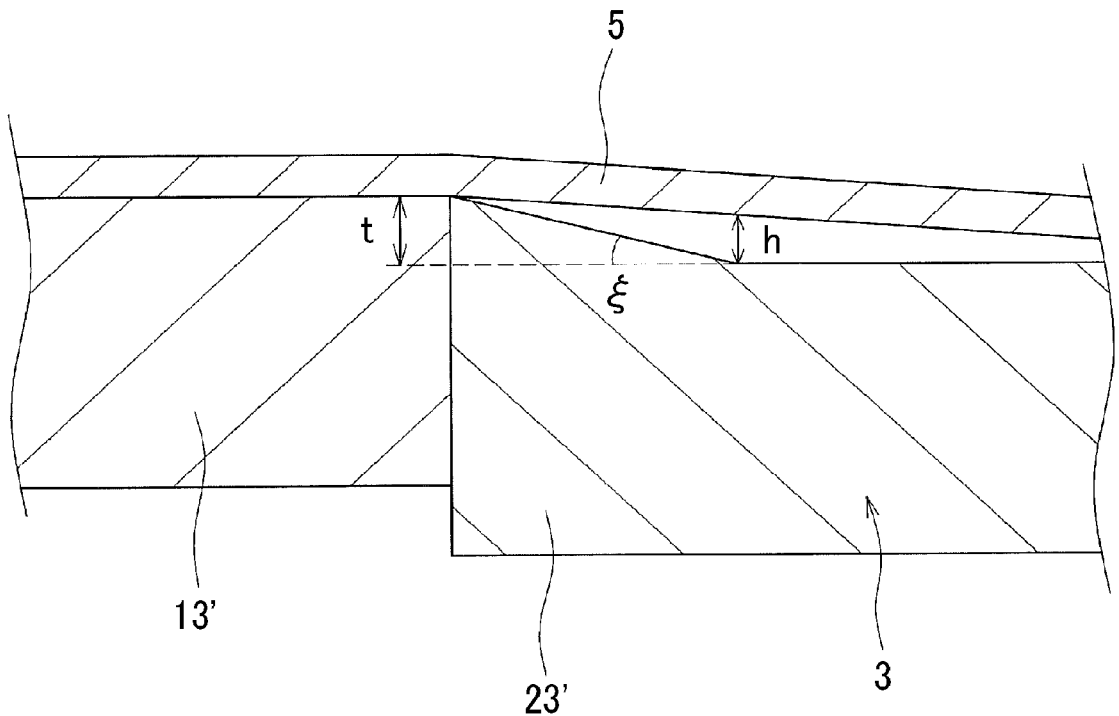
FIG. 9 is a conceptual diagram schematically describing a relationship between a gap between a liner and a carbon fiber, and a set inclination angle.
Figure 11:
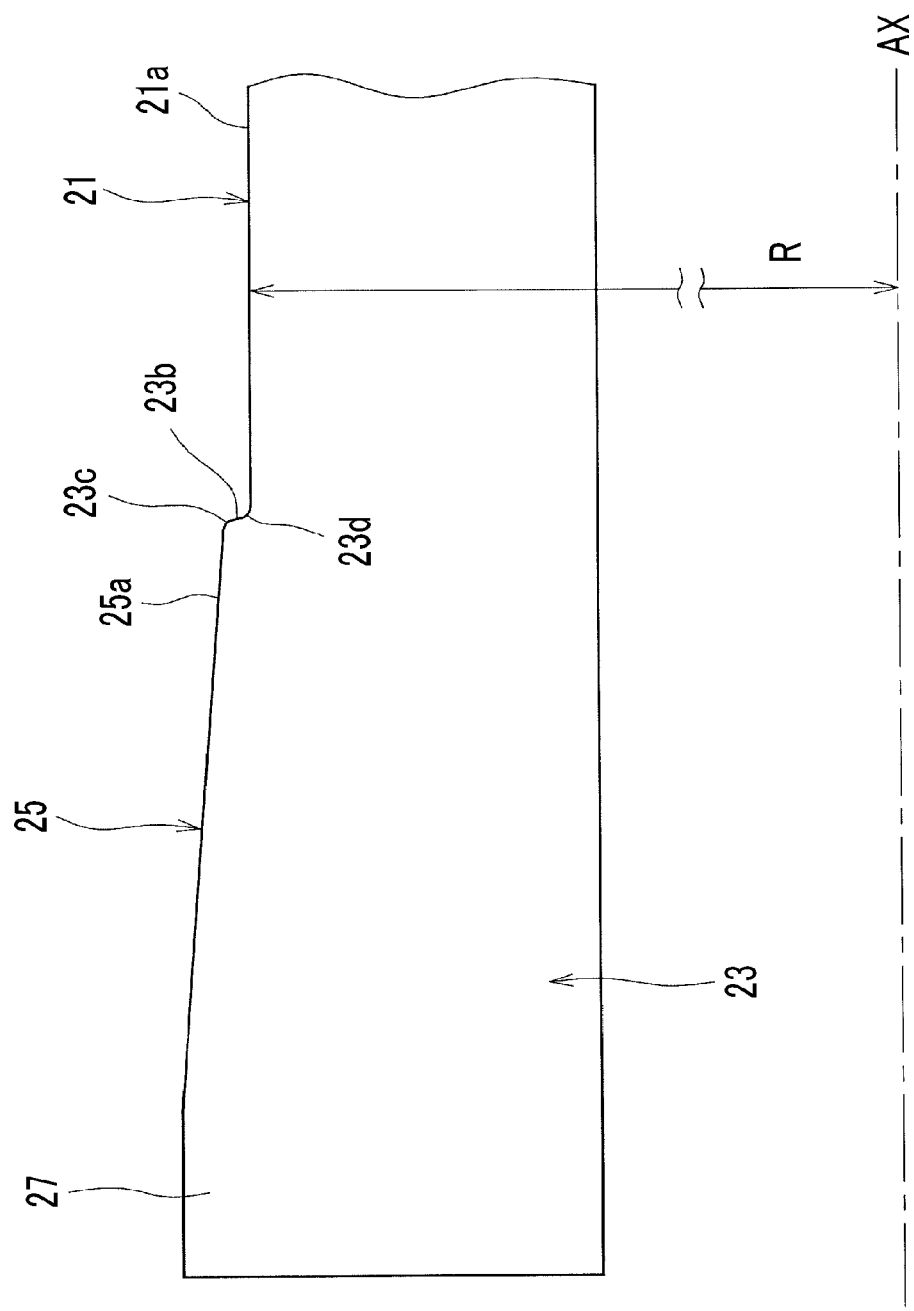
FIG. 11 is a sectional view schematically showing an end portion of a pipe according to Modification Example 1.

FIG. 9 is a conceptual diagram schematically describing the relationship between a gap h between the liner 3 and the carbon fiber 5 and a set inclination angle of the tapered portion 25. With respect to the set inclination angle that is the same as the ideal inclination angle θ (Verification Example 1) in Example 1 of the above Table 1 and ten set inclination angles that are different from the ideal inclination angle θ (Verification Examples 2 to 11) set without using the above Expression 1, the gap h between the liner 3 and the carbon fiber 5 was calculated. The results are shown in the following Table 2 and FIG. 10.

to each other simply by the stepped surface 23b. However, as shown in FIG. 11, a corner portion 23c between the inclined surface 25a and the stepped surface 23b, and a corner portion 23d between the outer peripheral surface 21a of the general portion 21 and the stepped surface 23b may be set to be round. In this case, although the effect of making the boundary between the tapered portion 25 and the general portion 21 easier to be recognized is weakened, stress concentration due to a sudden change in thickness is alleviated, and therefore, there is an advantage that a decrease in strength can be reduced.

Modification Example 2

Figure 12:
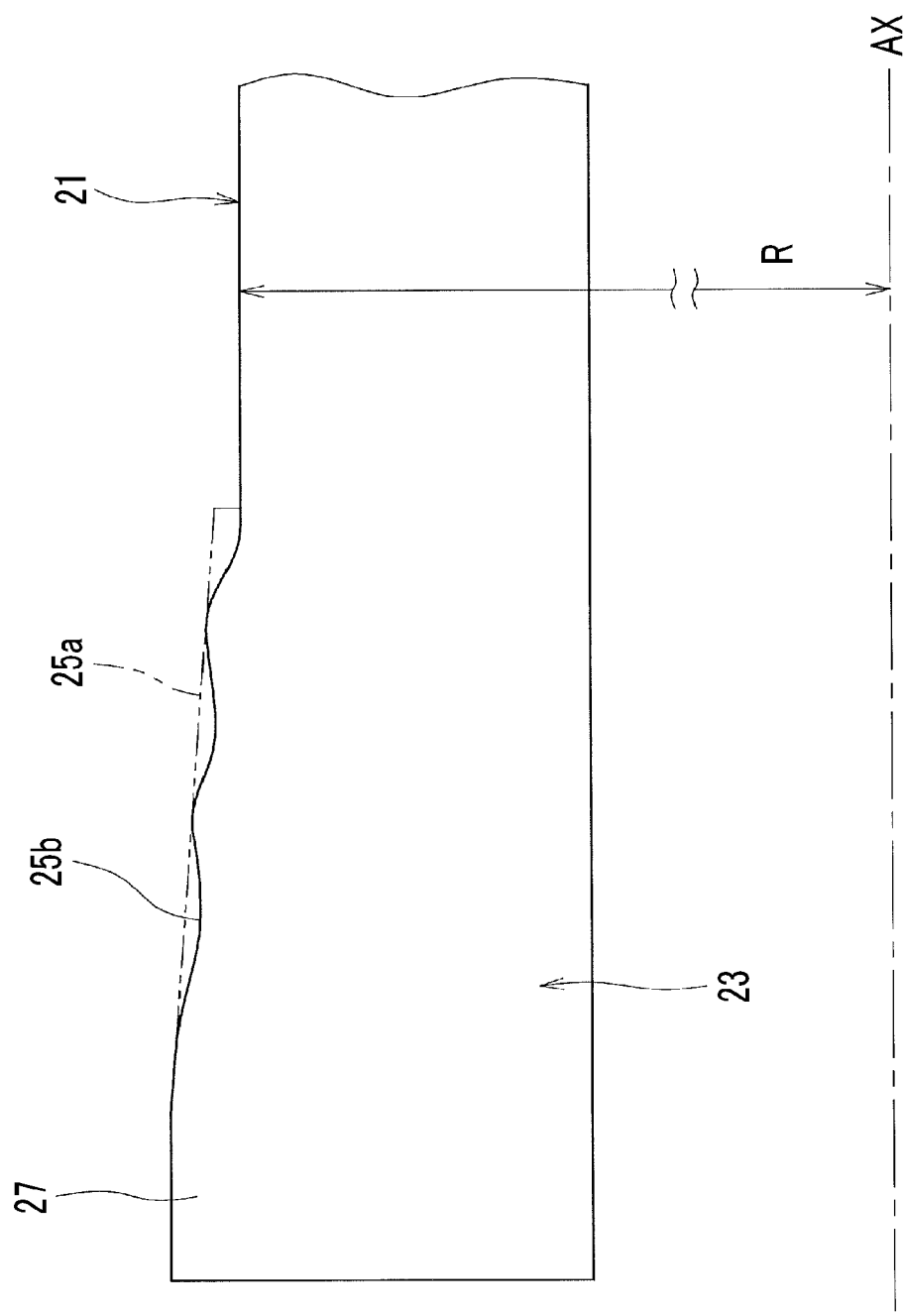
FIG. 12 is a sectional view schematically showing an end portion of a pipe according to Modification Example 2.

In the pipe 20 of the embodiment described above, the inclined surface 25a of the tapered portion 25 is made flat. However, as shown in FIG. 12, an irregularity 25b may be provided on the inclined surface 25a such that the fiber angle ψ can be reliably obtained with less friction when the carbon fiber 5 is placed on the inclined surface 25a. The depth of the irregularity 25b is set within the allowable range of the gap between the liner 3 and the carbon fiber 5.

TABLE 2

|  | Verification Example 1 | Verification Example 2 | Verification Example 3 | Verification Example 4 | Verification Example 5 | Verification Example 6 | Verification Example 7 | Verification Example 8 | Verification Example 9 | Verification Example 10 | Verification Example 11 |
|---|---|---|---|---|---|---|---|---|---|---|---|
| Fiber angle ψ (deg) | 35.0 | 35.0 | 35.0 | 35.0 | 35.0 | 35.0 | 35.0 | 35.0 | 35.0 | 35.0 | 35.0 |
| Outer circumference radius R (mm) | 150.0 | 150.0 | 150.0 | 150.0 | 150.0 | 150.0 | 150.0 | 150.0 | 150.0 | 150.0 | 150.0 |
| Estimated level difference amount t (mm) | 1.0 | 1.0 | 1.0 | 1.0 | 1.0 | 1.0 | 1.0 | 1.0 | 1.0 | 1.0 | 1.0 |
| Ideal inclination angle θ (deg) | 2.33 | 2.33 | 2.33 | 2.33 | 2.33 | 2.33 | 2.33 | 2.33 | 2.33 | 2.33 | 2.33 |
| Set inclination angle ξ (deg) | 2.33 | 4.65 | 6.98 | 9.31 | 11.63 | 13.96 | 16.29 | 18.61 | 20.94 | 23.27 | 25.59 |
| Gap h (mm) | 0.00 | 0.50 | 0.67 | 0.75 | 0.80 | 0.84 | 0.86 | 0.88 | 0.89 | 0.91 | 0.92 |

Figure 10:
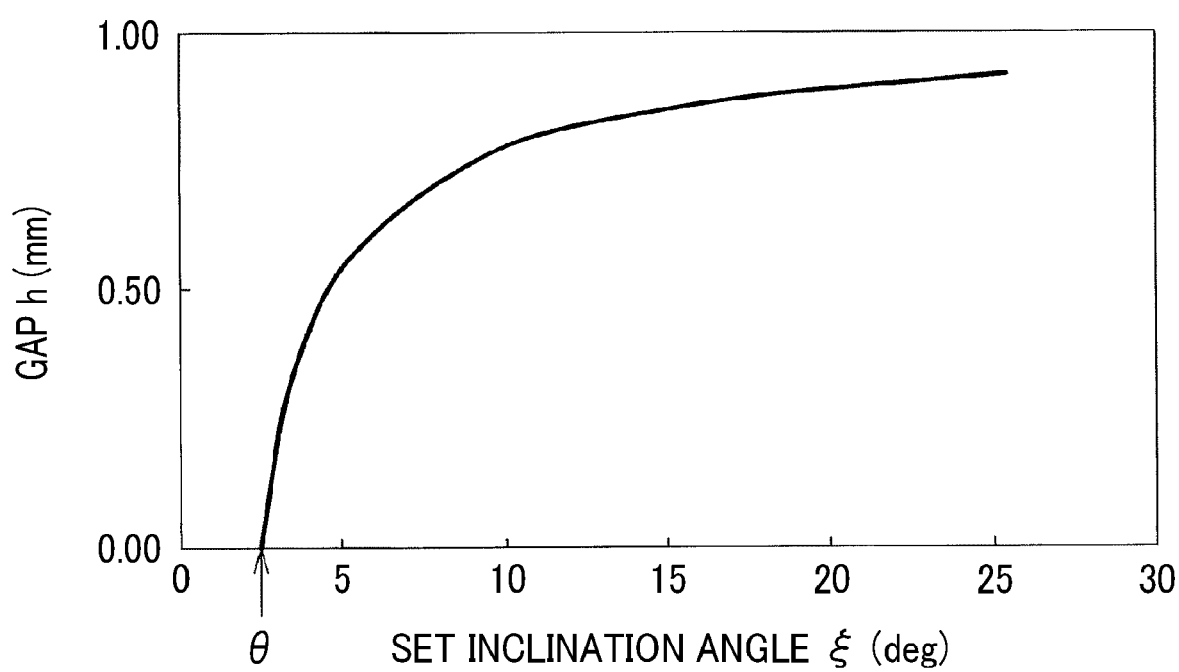
FIG. 10 is a graph schematically showing the relationship between the gap between the liner and the carbon fiber, and the set inclination angle.

As shown in Table 2 and FIG. 10, in Verification Example 1 that is the set inclination angle ξ that is the same as the ideal inclination angle θ, it was confirmed that the gap h between the liner 3 and the carbon fiber 5 is 0 (mm). In contrast, in Verification Examples 2 to 11, it was confirmed that the gap h between the liner 3 and the carbon fiber 5 increases and comes closer to the estimated level difference amount t=1.0 (mm) as the set inclination angle ξ gets away from the ideal inclination angle θ.

In this manner, in this embodiment, it is possible to make the gap between the liner 3 and the carbon fiber 5 be 0 (mm), and therefore, as described above, even though the height of the stepped surface 23b is set to the maximum value of the gap allowable range, as shown in FIG. 7, occurrence of a harmful gap in the vicinity of the stepped surface 23b can be suppressed.

Next, modification examples of the embodiment described above will be described. The following Modification Example 1 and Modification Example 2 can also be applied to the domes 10, 30.

Modification Example 1

In the pipe 20 of the embodiment described above, the tapered portion 25 and the general portion 21 are connected Other Embodiments An applicable embodiment of the present disclosure is not limited to the embodiment above and can be implemented in various other forms without departing from the spirit or main characteristics of the present disclosure.

In the embodiment described above, the present disclosure is applied to the liner 3 made of resin. However, there is no limitation thereto, and the present disclosure may be applied to a liner made of metal.

Further, in the embodiment described above, the joining of the liner constituent members 10, 20, 30 is performed by the infrared welding method. However, there is no limitation thereto, and the joining of the liner constituent members 10, 20, 30 may be performed by, for example, welding or bonding using a laser, vibration, friction stirring, or the like.

Further, in the embodiment described above, the three split-formed liner constituent members 10, 20, 30 are joined to configure the liner 3. However, there is no limitation thereto, and for example, liner constituent members divided into two or four or more parts may be joined to configure a liner.

Further, in the embodiment described above, the outer shell is formed with the carbon fiber 5. However, there is no limitation thereto, and the outer shell may be formed with, for example, a glass fiber.

In this manner, the embodiment described above is merely exemplification in all respects and should not be interpreted restrictively.

According to the embodiments of the present disclosure, it is possible to suppress occurrence of a harmful gap between the liner and the fiber while the minimum plate thickness of the liner is secured, and therefore, it is extremely useful for being applied to a method of manufacturing a high-pressure tank in which a fiber is wound around an outer periphery of a liner made by joining a plurality of parts, and the high-pressure tank.

What is claimed is:

1. A method of manufacturing a high-pressure tank including a liner formed by joining a plurality of cylindrical liner constituent members together, and a fiber wound around an outer periphery of the liner, the method comprising:
    preparing the cylindrical liner constituent members each having a cylindrical general portion and a joining end portion formed to be thicker than the cylindrical general portion such that, in a case where an estimated value of an amount of a level difference that is generated at a joined surface where the liner constituent members are joined together is set to be an estimated level difference amount, an outer diameter at least at an end face is larger than an outer diameter of the cylindrical general portion by the estimated level difference amount, as the cylindrical liner constituent members;
    joining the joining end portion of one of the cylindrical liner constituent members and the joining end portion of another one of the cylindrical liner constituent members together in an axial direction;
    cutting off portions on a further outer side in a radial direction than a reference plane, in both the joining end portions joined together, with an outer peripheral surface of the cylindrical general portion having a large outer diameter at the joined surface, out of the cylindrical liner constituent members joined together, as the reference plane; and
    winding the fiber around an outer peripheral surface of the liner in helical winding, wherein
    the joining end portion before joining has a cylindrical joining margin portion located at an extreme end portion of the joining end portion and having an outer diameter larger than the outer diameter of the cylindrical general portion by the estimated level difference amount, and a tapered portion having an outer diameter that decreases from the cylindrical joining margin portion toward the cylindrical general portion so as to connect an outer peripheral surface of the cylindrical joining margin portion and an outer peripheral surface of the cylindrical general portion; and
    the joining end portions of the respective cylindrical liner constituent members are joined together by melting the cylindrical joining margin portions of the respective cylindrical liner constituent members.

2. The method according to claim 1, wherein an inclination angle of the tapered portion is set so as to satisfy a relationship of an following expression, $\tan \theta = t \times \tan \psi /(R \times (1-R^2/(R+t)^2)^{1/2})$, here, $\theta$ is the inclination angle of the tapered portion, t is the estimated level difference amount, $\psi$ is a fiber angle of the fiber with respect to a center line of the liner in the winding, and R is an outer circumference radius of the cylindrical general portion.

3. The method according to claim 1, wherein:
    the inclined surfaces of the tapered portions of the respective cylindrical liner constituent members are stepped down to the outer peripheral surfaces of the cylindrical general portions before the inclined surfaces intersect the outer peripheral surfaces of the cylindrical general portions; and
    the joining end portions of the respective cylindrical liner constituent members are joined together in a state where the cylindrical general portions of the respective cylindrical liner constituent members are gripped and fixed.

* * * * *